United States Patent [19]

Morimoto

[11] Patent Number: 4,715,699

[45] Date of Patent: Dec. 29, 1987

[54] SCANNING OPTICAL SYSTEM FOR LASER BEAM PRINTERS

[75] Inventor: Akira Morimoto, Tokyo, Japan

[73] Assignee: Asahi Kogaku Kogyo Kabushiki Kaisha, Tokyo, Japan

[21] Appl. No.: 823,236

[22] Filed: Jan. 28, 1986

[30] Foreign Application Priority Data

Jan. 28, 1985 [JP] Japan .................... 60-13989
Apr. 22, 1985 [JP] Japan .................... 60-86705

[51] Int. Cl.⁴ .............................. G02B 26/08
[52] U.S. Cl. .............................. 350/6.8
[58] Field of Search .............. 350/6.8, 420, 433

[56] References Cited

U.S. PATENT DOCUMENTS

| | | | |
|---|---|---|---|
| 4,277,128 | 7/1981 | Kawamura | 350/420 |
| 4,318,583 | 3/1982 | Goshima et al. | 350/6.8 |
| 4,523,801 | 6/1985 | Baba et al. | 350/6.8 |
| 4,565,421 | 1/1986 | Minoura | 350/6.8 |

Primary Examiner—John K. Corbin
Assistant Examiner—Vincent J. Lemmo
Attorney, Agent, or Firm—Sughrue, Mion, Zinn, Macpeak, and Seas

[57] ABSTRACT

A scanning optical system such as a laser beam printer that comprising a semiconductor laser, a collimator lens that produces substantially parallel rays of light from the beam emitted from the semiconductor laser, a convex cylinder lens having a curvature within a cross section taken in the auxiliary scanning direction, a deflector, and a scanning lens that focuses the deflected rays to form a spot on a scanning surface. The normal direction of light emitting from the semiconductor laser being in alignment with the scanning direction of the scanning lens system, and the scanning lens system having an anamorphic configuration.

9 Claims, 22 Drawing Figures

FIG. 3
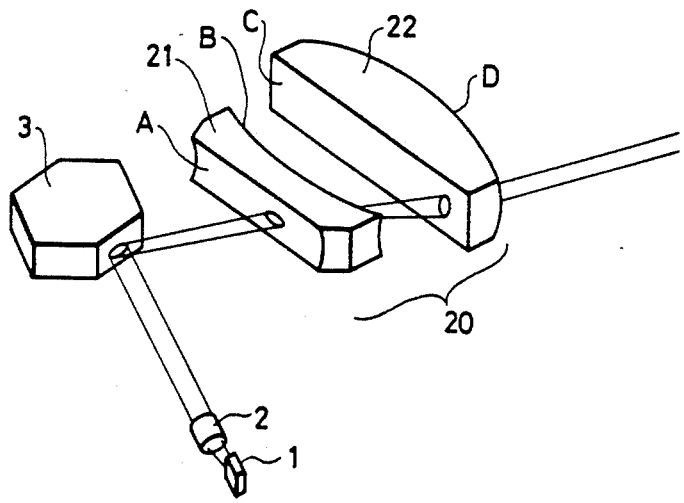
FIG. 4a
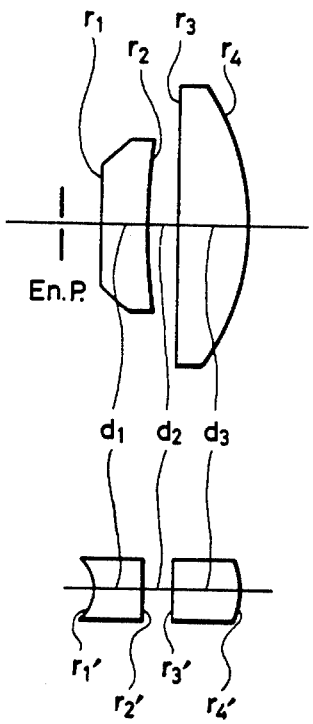
FIG. 4b

SCANNING OPTICAL SYSTEM FOR LASER BEAM PRINTERS

BACKGROUND OF THE INVENTION

The present invention relates to a scanning optical system such as a laser beam printer having no pitch irregularity and other scanning-associated problems.

A scanning optical system such as a laser beam printer which uses a semiconductor laser as a light source is shown schematically in FIG. 15; the system comprises a semiconductor 1 which emits a laser beam, a collimator lens 2 that produces substantially parallel rays of light from the beam emitted from the semiconductor laser 1, a deflector 3 such as a rotating polygonal mirror that deflects said rays of light, and a scanning lens system 4 that focuses the deflected rays to form a spot at a predetermined location on a scanning surface 5. In the following description, the direction in which scanning is performed on the scanning surface 5 is referred to as the principal scanning direction, and the direction normal to that scanning direction is referred to as the auxiliary scanning direction. If the diameter of the optical luminous flux is written as D, the focal distance of the scanning system 4 as f, and the wavelength as $\lambda$, then the diameter:

$$S = k \cdot \lambda \cdot (f/D)$$

The scanning lens system 4 often employs an f·$\theta$ lens so as to establish a linear relationship between the deflection rate and the scanning speed. The f·$\theta$ lens is one that satisfies the relation: $y = f \cdot \theta$, wherein $\theta$ is the incident angle (i.e., the angle the incident beam forms with the optical axis of the lens) and y is the image height (i.e., the distance between the spot on the scanning surface 5 and the optical axis). This characteristic can be obtained by designing the scanning lens system so that it will have a negative value of distortion (Dist) expressed by:

$$Dist = \frac{y/f - \tan(y/f)}{\tan(y/f)} \times 100(\%).$$

The semiconductor laser used as a light source radiates light in different modes as between the direction parallel to the junction surface (this direction is hereunder simply referred to as the parallel direction) and the direction perpendicular to that parallel direction (this direction is hereunder simply referred to as the normal direction). As shown in FIG. 16, the angle of spread of light in the parallel direction, $\theta_2$, is smaller than the angle of spread in the normal direction, $\theta_1$. In addition, light is radiated in the parallel direction from the semiconductor laser at a point more inward than the point where light is radiated in the normal direction, and this astigmatic difference will hereinafter be referred to as "astigmatism as" in FIG. 16.

Therefore, if the semiconductor laser having such characteristics is assembled into a scanning optical system that also includes a collimator lens, a deflector and a scanning lens system, light emitted from the laser will spread in different angles as between the parallel and normal directions. As a consequence, the diameter, $D_2$, of the beam that emerges from the collimator lens in the parallel direction comes out to be different from the diameter, $D_1$, of the beam emerging in the normal direction as follows:

$$D_2 = fc \sin(\theta_2/2) < fc \sin(\theta_1/2) = D_1$$

(where fc is the focal distance of the collimator lens). This causes the diameter of the spot in the parallel direction to differ from the spot diameter in the normal direction as follows:

$$S_2 = k \cdot \lambda \cdot (f/D_2) > k \cdot \lambda \cdot (f/D_1) = S_1$$

(where $S_2$ is the spot diameter in the parallel direction, and $S_1$ is the spot diameter in the normal direction). As a result, the spot formed on the scanning surface is by no means circular.

The astigmatism as inherent in the semiconductor laser causes another problem. The point at which an image is formed on the scanning surface by focusing through the scanning lens system 4 is offset in the optical axial direction as between the scanning direction and the direction normal to that direction (the latter direction is hereunder referred to as the auxiliary scanning direction), and the amount of this offset is given by:

$$\Delta = as \cdot (f/fc)^2$$

where f is the focal distance of the scanning lens system, and fc is the focal distance of the collimator lens).

The first defect resulting from the use of a semiconductor laser as a light source, that is, the formation of a non-circular spot on the scanning surface, may be eliminated by the following beam shaping methods: (1) the aperture of the collimator lens 2 is reduced or a slit is provided, so that the light in the normal direction is rejected to provide light beams having the same diameter in both the parallel and normal directions; and (2) an afocal anamorphic optical system 10 is disposed between the collimator lens 2 and the deflector 3 as shown in FIG. 17, with a view to adjusting the diameter of light beam. The first method, however, reduces the energy efficiency of light while the second method requires a complicated optical system.

The second defect associated with the use of a semiconductor laser as a light source, that is, the offset of an image forming point in the optical axial direction that is caused by the astigmatism as, may be eliminated by disposing a cylindrical lens 11 between the semiconductor laser and the collimator lens 2 or between the collimator lens 2 and the deflector 3, as shown in FIG. 18, so that the point at which laser light is emitted in the parallel direction is in apparent alignment with the point at which light is emitted in the normal direction. However, the cylinder lens 11 required in this method must have a large radius of curvature and is very difficult to manufacture.

A further problem results from the fact that the deflector 3 employs a rotating polygonal mirror or a hologram scanner; any error that is introduced by the unavoidable inclination of each of the surfaces of the polygonal mirror, or the error that exists between the elements of the hologram scanner will cause an error in the deflector surface in the auxiliary scanning direction, and this in turn causes unevenness in the scanning pitch.

Several methods have been proposed for solving the last-mentioned problem:

(1) As shown in FIG. 19, a first anamorphic optical system 13 that acts within a plane in the auxiliary scanning direction is disposed between the collimator lens 2 and the deflector 3 so as to form a line image on the deflector surface and, at the same time, a second anamorphic optical system 14 is added to the scanning lens system 4 or the scanning lens system 4 itself is designed to have an anamorphic configuration. By employing this arrangement, the deflector surface is rendered conjunctive with the scanning surface within a plane in the auxiliary scanning direction, so that any error that may be caused in the image point in the auxiliary scanning direction as a result of undesired inclination of the deflecting surface will be eliminated.

(2) As shown in FIG. 20, the first anamorphic optical system 13 acting within a plane in the auxiliary scanning direction is disposed in front of the deflector 3 but no line image is formed on the deflecting surface by that optical system, with the second anamorphic optical system 14 being added to the scanning lens system 4 or the scanning lens system 4 itself being designed to have an anamorphic configuration. This arrangement is intended to reduce the sensitivity of error in the image point to any unwanted inclination in the auxiliary scanning direction of the deflecting surface in the image forming optical system including the first anamorphic optical system 13.

Each of these techniques is disadvantageous in that:

(a) the first anamorphic optical system must be disposed in front of the deflector; and (b) the optical system at the rear of the deflector provides such an increased positive refractive power in the auxiliary scanning direction that the curvature of field to be scanned is increased.

Examples of the scanning system employing the method (1) are shown in Japanese Patent Publication No. 28666/1977, and Unexamined Published Japanese Patent Application Nos. 144515/1982 and 93021/1983, while an example of the system using the method (2) is disclosed in Unexamined Published Japanese Patent Application No. 192920/1982. Each of the systems shown in these patents requires the use of a first anamorphic optical system having either a positive or a negative refractive power. In particular, the systems shown in Unexamined Published Japanese Patent Application Nos. 93021/1983 and 192920/1982 employ a cylindrical lens as the first anamorphic optical system, and in order to reduce the curvature of field, the length of the cylinder lens must be extended so that it can be disposed closed to the scanning surface.

SUMMARY OF THE INVENTION

The present invention has been accomplished in order to eliminate the aforementioned defects of the prior art techniques.

The principal object, therefore, of the present invention is to provide a scanning optical system such as a laser beam printer that does not have to use a first anamorphic optical system for correcting any error introduced in the auxiliary scanning direction primarily because of undesired inclination of the deflecting surfaces of the deflector, and which additionally has both the capacity of correcting an offset that may occur in the image point as between the scanning and auxiliary scanning directions owing to the astigmatic difference inherent in the semiconductor laser, and the beam shaping ability.

According to the present invention, a scanning optical system such as a laser beam printer is composed of a semiconductor laser, a collimator lens that produces substantially parallel rays of light from the beam emitted from the semiconductor laser, a deflector for deflecting said parallel rays of light, and a scanning lens system that focuses the deflected rays to form a spot on a scanning surface. The normal direction of light emitting from the semiconductor laser is in alignment with the scanning direction of said scanning optical system. The scanning lens system has an anamorphic configuration and is so designed that the point of an image formed in the auxiliary scanning direction upon receiving parallel rays of light containing no astigmatism is offset from the point of an image formed in the scanning direction.

According to another aspect of the present invention, there is provided a scanning optical system such as a laser beam printer that is composed of a semiconductor laser, a collimator lens that produces substantially parallel rays of light from the beam emitted from the semiconductor laser, a convex cylinder lens having a curvature within a cross section taken in the auxiliary scanning direction, a deflector that deflects the rays of light emerging from said cylinder lens which are convergent in the auxiliary scanning direction and are shaped to have a smaller cross section in the auxiliary scanning direction than at the time when they emerged from the collimator lens, and a scanning lens that focuses the deflected rays to form a spot on a scanning surface. The normal direction of light emitting from the semiconductor laser is in alignment with the scanning direction of the scanning lens system. The scanning lens system has an anamorphic configuration and is so designed that the point of an image formed in the principal scanning direction is coincident with the point of an image formed in the auxiliary scanning direction.

BRIEF DESCRIPTION OF THE DRAWINGS

FIG. 3 is a diagram showing the overall arrangement of the scanning optical system in accordance with the present invention;

FIG. 4 shows the arrangement of the scanning lens system used in Example 1, (a) referring to a cross section taken in the scanning direction, and (b) a cross section taken in the auxiliary scanning direction;

DETAILED DESCRIPTION OF THE PREFERRED EMBODIMENT

Embodiments of the present invention are hereunder described by reference to the accompanying drawings.

Figure 1:
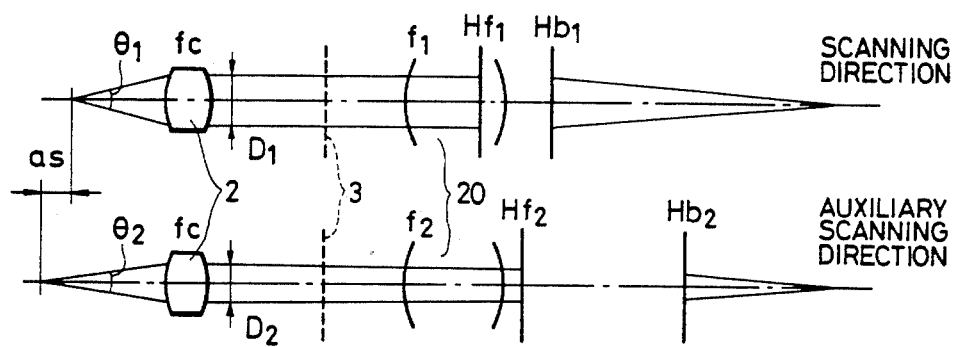
FIG. 1 shows the basic arrangement of the scanning optical system of the present invention.

FIG. 1 shows the basic arrangement of the scanning optical system such as a laser beam printer in accordance with the present invention. In this system, the normal direction of laser beam emitting from the semiconductor is in alignment with the scanning direction of the laser beam printer, while the parallel direction of light radiated from the semiconductor laser is in alignment with the auxiliary scanning direction of the printer.

The scanning optical system of FIG. 1 comprises, in order from the object side, the semiconductor laser, a collimator lens 2, a deflector 3, and an anamorphic scanning lens system 20 that is the heart of the present invention. The semiconductor laser, the collimator lens 2 and the deflector 3 are of the known types and need not be described in detail. Therefore, the following description concerns primarily the anamorphic scanning lens system. In FIG. 1, $Hf_1$ and $Hb_1$ represent the positions of the principal points on the object side and the image side within a cross section of the scanning lens taken in the scanning direction, and $Hf_2$ and $Hb_2$ represent the positions of the principal points on the object side and the image side within a cross section taken in the auxiliary scanning direction.

(1) Error in the deflecting surface in the auxiliary scanning direction

As described in connection with the prior art, the scanning lens system typically employs an f·θ lens so if this lens is used in the conventional scanning lens system 4 (FIG. 10), its focal distance f is determined uniquely by the scanning width and angle of the laser beam printer.

However, an f·θ scanning lens system composed of spherical lens units has the same focal distance in both the auxiliary scanning direction and the scanning direction. Therefore, if rays of light are shifted by θs in the auxiliary scanning direction for some reason such as, for example, the error caused by undesired inclination of the deflecting surface 3, the spot being scanned will also be offset from the reference position in the auxiliary scanning direction by the amount of f·θs, and this causes unevenness in the scanning pitch.

In accordance with the present invention, the scanning lens system 20 has an anamorphic configuration, and the focal length, $f_1$, of the lens system in the scanning direction can be made greater than the focal length, $f_2$, in the auxiliary scanning direction. If this relation is satisfied, the amount of offset in the scanning position in the auxiliary scanning direction is equal to $f_1 \cdot \theta s$. Therefore, the anamorphic scanning lens system 20, which has the same focal distance f in the scanning direction as the spherical lens system, exhibits a sensitivity to the error in the deflecting surface in the auxiliary scanning direction which is lower than the value for the spherical lens system by $f_2/f_1$.

The anamorphic scanning lens system 20 is unable to accomplish as complete a correction as is achieved by the system wherein a line image is formed on a deflecting surface, but since rays of light that are reflected from the deflecting surface fall on it over a certain area, rather than at a very small point, the system 20 is insensitive to noise effects such as scratches or dust particles on the deflecting surface.

(2) Beam shaping ability

The system of the present invention has the beam shaping ability since in this system the normal direction in which light emitting from the semiconductor laser 1 has a wide angle of spread is combined with the scanning direction in which the scanning lens system 20 has a long focal distance, while the parallel direction in which laser light has a narrow angle of spread is combined with the auxiliary scanning direction in which the lens system 20 has a short focal distance.

As already mentioned in connection with the prior art, the angle of spread of laser light in the normal direction, $\theta_1$, is wider than the angle of spread in the parallel direction, $\theta_2$. Therefore, if the diameter of the laser beam emerging from the collimator lens 2 in the scanning direction is written as $D_1$ and the diameter of the beam emerging from the lens 2 in the auxiliary scanning direction is written as $D_2$, then $D_1 = fc \sin(\theta_1/2) fc \sin(\theta_2/2) = D_2$. The diameters of the spots, $S_1$ and $S_2$, formed by the respective beams on the scanning surface are given by:

$$S_1 = k \cdot \lambda \cdot \frac{f_1}{D_1} = k \cdot \lambda \frac{f_1}{f_c \sin(\theta_1/2)}$$

$$S_2 = k \cdot \lambda \cdot \frac{f_1}{D_1} = k \cdot \lambda \frac{f_1}{f_c \sin(\theta_1/2)}$$

From these equations, the ratio of $S_1$ to $S_2$ can be calculated as:

$$\frac{S_1}{S_2} = \frac{f_1 D_2}{f_2 D_1} = \frac{f_1}{f_2} \cdot \frac{\sin(\theta_2/2)}{\sin(\theta_1/2)}$$

As mentioned earlier, the focal distance, $f_1$, of the scanning lens system 20 in the scanning direction is smaller than the focal distance, $f_2$, in the auxiliary scanning distance. Therefore, if the lens system 20 is so designed that $f_1/f_2$ is approximately equal to $\theta_1/\theta_2$, a substantially circular spot can be obtained on the scanning surface. This is the mechanism lying behind the ability of the lens system 20 to shape the beam spot in a nearly circular form.

In the prior art system using a scanning lens system 4 composed of spherical lens units, the afocal anamorphic optical system 10 is necessary for shaping the beam spot to obtain a substantially circular form. This afocal anamorphic optical system 10 need not be incorporated in the system of the present invention.

(3) Correcting offset in image point due to astigmatism $as$

If, in the case of using as a light source the semiconductor laser 1 having the astigmatism as, the point at which laser light is emitted in the normal direction is positioned at the focal point of the collimator lens 2, so that parallel direction is offset by $-as$ (assuming that the direction in which light travels in the optical axial direction is positive). As a result, the rays of light within a cross-section taken in the auxiliary scanning direction become convergent, and the point of the image formed by the conventional scanning lens system will be offset from the image point in the scanning direction by the amount of $-as\cdot(f_2/fc)^2$.

Figure 2:
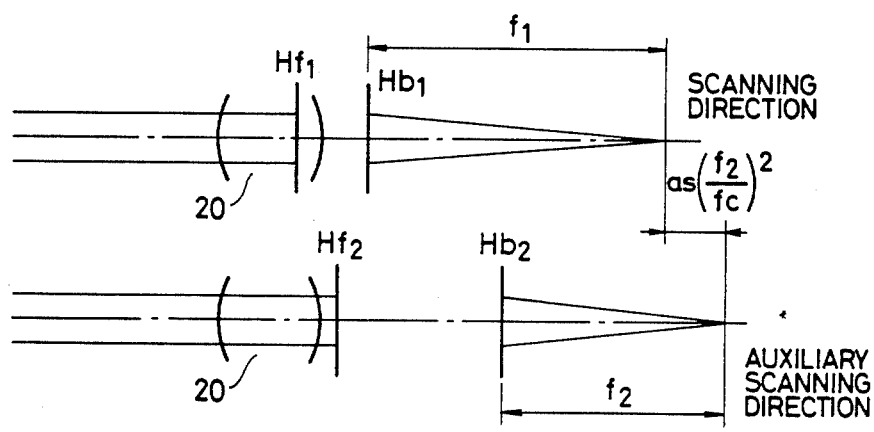
FIG. 2 shows the scanning lens system 20 which is so designed that the point of an image formed in the auxiliary scanning direction upon receiving parallel rays of light is offset from the point of an image formed in the scanning direction.

In order to avoid this problem, the anamorphic scanning lens system 20 of the present invention is so designed that when parallel rays of light enter, an image will form at a point in the auxiliary direction that is offset by the amount of $as\cdot(f_2\cdot fc)^2$ from the point at which an image forms in the scanning direction, as shown in FIG. 2. By combining the so designed anamorphic scanning lens system 20 with the semiconductor laser 1, the offset that may occur between the points of the images formed in the scanning direction and the auxiliary scanning direction can be eliminated even if the laser has the astigmatic difference as.

The actual amount of offset that is preliminarily provided for the image points on the optical axis may be varied slightly from the above specified value in consideration of the curvature of field or the deviation from the best image plane.

In the arrangement described above, the focal distance in the auxiliary scanning direction is shorter than the value in the scanning direction and the focal point in the auxiliary scanning direction is offset from the focal point in the scanning direction by a positive amount of $as\cdot(f_2/fc)^2$. It should, therefore, be noted that the principal point of the scanning lens system 20 on the image side in the auxiliary scanning direction must be positioned away from the principal point on the image side in the scanning direction by a positive amount of $f_1-f_2+as\cdot(f_2/fc)^2$.

As described above, the scanning optical system of the present invention achieves the advantages (1) to (3) by merely adjusting the performance of the anamorphic scanning lens system 20.

It should also be mentioned that because of the structural limitations inherent in the semiconductor laser, the transversal mode of oscillation and other factors may produce a non-ideal light source in the parallel direction, which will eventually lead to the formation of a large spot as a result of laser beam emission. This phenomenon can be effectively dealt with by the system of the present invention wherein the focal distance of the scanning lens in the auxiliary scanning direction is sufficiently shorter than in the scanning direction to provide a lower magnification for the projection of the light source.

The specific arrangement of the scanning optical system of the present invention is hereunder described with reference to FIG. 3.

FIG. 3 is the general schematic view of the scanning optical system in accordance with the present invention; as shown, the system comprises the semiconductor laser 1, the collimator lens 2, the deflector 3, and the anamorphic scanning lens system 20 composed of two lens units.

In accordance with the present invention, the scanning lens system 20 is anamorphic, so $f_2$ can be made sufficiently smaller than $f_1$ to attain the advantages (1) and (2). In addition, the lens system includes within a cross section taken in the auxiliary scanning direction a concave cylindrical surface having a negative refractive power toward the deflector and a convex toric surface having a positive refractive power toward the scanning surface. Because of this "retrofocal" arrangement, the position of the principal point on the image side in the auxiliary scanning direction can be shifted toward the scanning surface by a sufficiently great amount to satisfy the requirement for attaining the advantage (3). The scanning lens system 20 includes two additional surfaces with negative and positive refractive powers which are positioned at the rear of the deflecting surface and the within a cross section taken in the auxiliary scanning direction. The refractive powers of these surfaces are stronger within the cross section taken in the auxiliary scanning direction than in the scanning direction. Therefore, by means of properly adjusting these surfaces, the curvature of field can be corrected effectively and with a simple and compact arrangement.

In one embodiment, the scanning lens system 20 may be composed of an $f\cdot\theta$ lens and, in this case, the $f\cdot\theta$ lens may be comprised of two lens units, a first unit 21 (see FIG. 3) that has, in order from the deflector 3, a first surface A which is formed as a concave cylindrical surface having a curvature within a cross section taken in the auxiliary scanning direction and a second surface B formed as a concave spherical surface, and a second unit 22 that has, in order from the deflector 3, a third surface C formed as a planar surface and a fourth surface D formed as a toric surface having a smaller radius of curvature within a cross section taken in the auxiliary scanning direction than within a cross section taken in the scanning direction. This minimum number of lens elements is sufficient to make up the scanning lens system 20 having good performance in accordance with the present invention. In the $f\cdot\theta$ lens shown above, the first lens unit 21 positioned closer to entrance end serves as a planoconcave lens and the second lens unit 22 as a planoconvex lens within a cross section taken in the scanning direction. In addition, the first lens unit has a negative refractive power. Because of this arrangement, the $f\cdot\theta$ lens is effective for the purpose of correcting spherical and coma aberrations.

A further advantage results from the fact that the second surface B is concave and provides a strong refractive power for off-axis rays of light; this causes the light emerging from the second surface B to fall on the third surface C at an increased height and the resulting increase in the negative distortion that develops at the surface C will provide superior $f\cdot\theta$ characteristics.

Within a cross section taken in the auxiliary scanning direction, the first lens unit 21 acts as a biconcave lens and the second lens unit 22 as a planoconvex lens. The first surface A has a strong negative refractive power at the concave surface having a small radius of curvature while the fourth surface D has a strong positive refractive power at the convex surface having a small radius of curvature. Because of this "retorofocal" arrangement, the focal distance in the auxiliary scanning direction can be shortened so that the principal point on the image side is brought closer to the image plane.

The $f\cdot\theta$ lens described above includes a cylindrical surface in the first lens unit 21 and a toric surface in the second lens unit 22. The cylindrical surface is fairly easy to obtain, and the second lens unit 22 including a toric surface also presents an advantage from a manufacturing viewpoint since one of its two surfaces is planar. Should any error occur in working operations to form the cylindrical surface in the first lens unit 22 and the toric surface in the second lens unit 22, the focal distance in the scanning direction and the auxiliary scanning direction may be adjusted by properly changing the distance between the first lens unit 21 and the second lens unit 22. This is possible because the refractive powers of the first lens unit 21 and the second lens unit 22 are stronger in the auxiliary scanning direction than in the scanning direction, and the sensitivity of the position of the focal points of these lens units to a change in the distance therebetween also differs between the scanning direction and the auxiliary scanning direction.

A scanning lens system having even better performance can be constructed if the following relations are satisfied:

$$0.3 < \frac{f_2}{f_1} < 0.6 \quad (1)$$

$$0.2 < \frac{|r_1'|}{f_2} < 0.3 \quad (2)$$

$$0.2 < \frac{|r_4'|}{f_1} < 0.3 \quad (3)$$

where
- $f_1$: the focal distance of the scanning lens system within a cross section taken in the scanning direction;
- $f_2$: the focal distance of the lens system within a cross section taken in the auxiliary scanning direction;
- $r_1'$: the radius of curvature of a cross section of the first surface of the scan lens system taken in the auxiliary scanning direction; and
- $r_4'$: the radius of curvature of a cross section of the fourth surface of the scanning lens system, taken in the auxiliary scanning direction.

Formula (1) specifies the requirement that should be satisfied by the ratio of the focal distance of the scanning lens system in the auxiliary scanning direction to the focal distance in the scanning direction. If $f_2/f_1$ is equal to or smaller than 0.3, the efficiency of correcting an error in the deflecting surface in the auxiliary scanning direction is increased but, at the same time, the beam shaping ability becomes excessively great to produce an undesirably shaped spot. Furthermore, the radii of curvature of the cylindrical and toric surfaces become too small to permit effective correction of aberrations. If, on the other hand, $f_2/f_1$ is equal to or greater than 0.6, the desired correction of any inclination of the deflecting surface or the beam shaping ability cannot be achieved, and either uneven scanning pitch or an elliptic spot will result.

Formula (2) specifies the requirement that should be met by the radius of curvature of the cylindrical surface. If $|r_1'|/f_2$ is equal to or smaller than 0.2, the degree by which the rays of light within a cross section of the first surface taken in the auxiliary scanning direction are made divergent is so much increased that it becomes difficult to correct the curvature of field in a manner that strikes a balance between $r_1'$ and $r_4'$. If $|r_1'|/f_2$ is equal to or greater than 0.3, the distance between the principal points within a cross section taken in the auxiliary scanning direction cannot be effectively increased, and in order to bring the principal point on the image side sufficiently close to the image plane, the overall size of the lens system must be increased. In addition, the negative curvature of field that will develop at the toric surface cannot be adequately corrected.

Formula (3) specifies the requirement that should be satisfied by the radius of curvature of the toric surface within a cross section taken in the auxiliary scanning direction. If $|r_4'|/f_1$ is equal to or smaller than 0.2, the principal point on the image side cannot be brought sufficiently close to the image plane and curvature of field will occur in a great amount. If $|r_4'|/f_1$ is equal to or greater than 0.3, the focal distance in the auxiliary scanning direction cannot be rendered sufficiently smaller than the focal distance in the scanning direction to achieve the desired degree of correction of the inclination of the deflecting surface or of the beam shaping effect.

It should be noted here that in order to maintain the Petzval's sum at a sufficiently small value to realize effective correction of aberrations, the refractive index of the first lens unit, $n_1$, is desirably smaller than the refractive index of the second lens unit, $n_2$.

Figure 5:
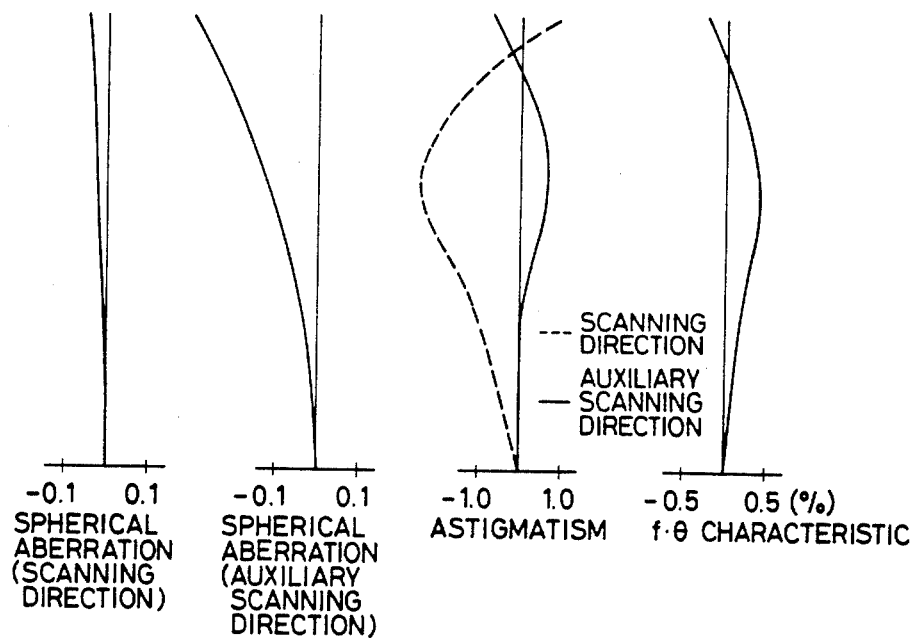
FIG. 5 shows aberration diagrams for the overall system disclosed in Example 1.
Figure 6:
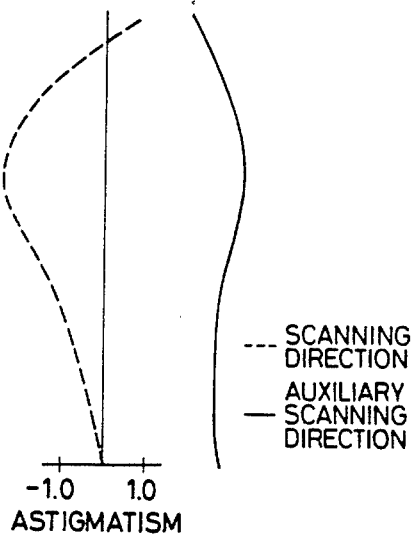
FIG. 6 shows aberration diagrams for the case where parallel rays of light having no astigmatism enter the scanning lens system.
Figure 7A:
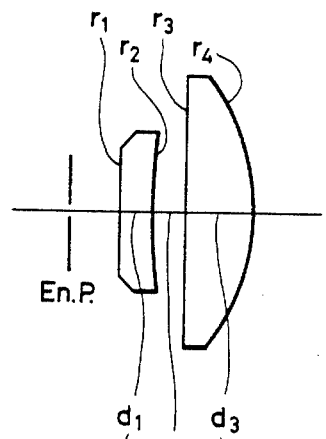
FIG. 7 is a lens diagram showing the arrangement of the scanning lens system used in Example 2, (a) referring to a cross section taken in the scanning direction, and (b) a cross section taken in the auxiliary scanning direction.
Figure 7B:
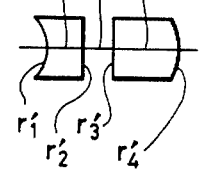
Figure 8:
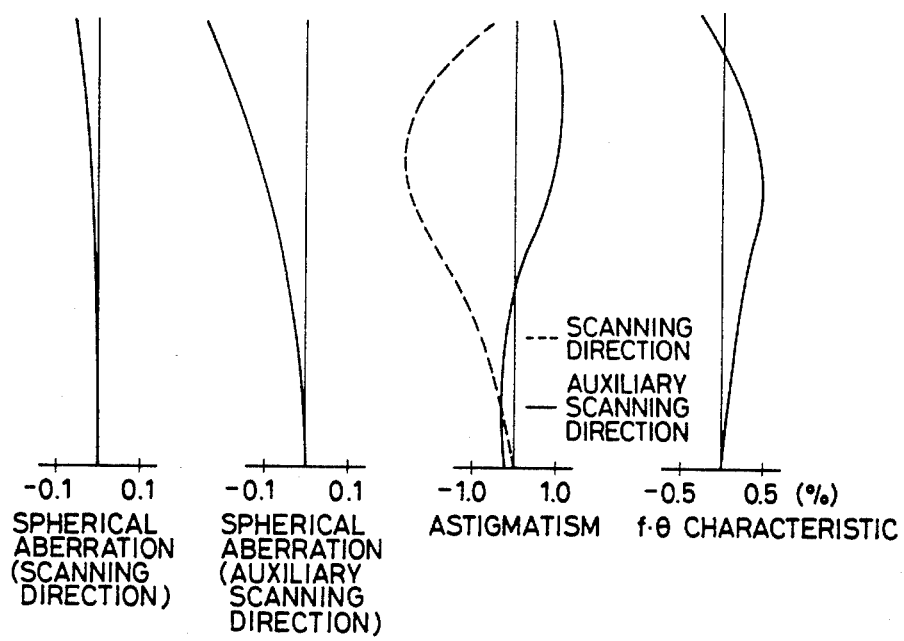
FIG. 8 shows aberration diagrams for the overall system disclosed in Example 2.
Figure 9:
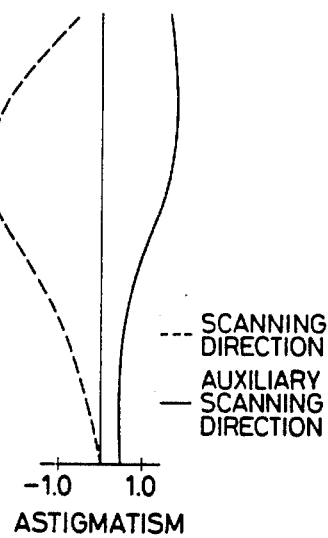
FIG. 9 shows aberration diagrams for the case where parallel rays of light containing no astigmatism enter the scanning lens system.

Two specific examples of the scanning optical system in accordance with the present invention are hereunder described by reference to FIGS. 4 to 9. FIGS. 4 to 6 show Example 1, and FIGS. 7 to 9 refer to Example 2. The "f-θ characteristic" curves shown in FIGS. 5 and 8 depict deviations from the idealized image height yθ. The embodiments of the two examples assume the following conditions: the semiconductor laser has an astigmatic difference as; the collimator lens 2 has a focal distance of fc; the rays of light emerging from the collimator lens 2 have a diameter of $D_1$ in the scanning direction and a diameter of $D_2$ in the auxiliary scanning direction; the scanning lens system 20 has a focal distance of $f_1$ in the scanning direction, and a focal distance of $f_2$ in the auxiliary scanning direction. The scanning lens system 20 has a back focus of $fb_1$ in the scanning direction with respect to parallel rays of light and a back focus of $fb_2$ in the auxiliary scanning direction. The scanning lens system 20 is composed of two lens units having the f-θ characteristics in the scanning direction; the system has, in order from the deflector side, a first cylindrical surface having a curvature in the auxiliary scanning direction, a second concave surface, a third planar surface, and a fourth convex surface having a small radius of curvature in the auxiliary scanning direction. The other parameters are as follows: $r_i$, the radius of curvature of a cross section of the i-th surface taken in the scanning direction; $r_i'$, the radius of curvature of a cross section of the i-th surface taken in the auxiliary scanning direction; $d_1$, the thickness at the center of the first lens unit; $d_2$, the aerial distance between the first and second lens units; $d_3$, the thickness at the center of the second lens unit; $n_1$, the refractive index of the first lens unit at the operating wavelength of 780 nm; $n_2$, the refractive index of the second lens unit at 780 nm; and $\pm\omega^*$, the scanning angle. The scanning lens system 20 is so arranged that the position of the entrance pupil, EnP, is in alignment with any selected deflecting surface.

EXAMPLE 1

Parameters for the overall system:

```
as = 0.01
fc = 3.0
D₁ = 2.5, D₂ = 1.0
f₁ = 125.02, f₂ = 50.03
fb₁ = 129.75, fb₂ = 132.49
```

$$as \cdot \left(\frac{f_2}{fc}\right)^2 = 2.78, \quad \frac{f_2}{f_1} = 0.40$$

-continued $$\frac{|r_1'|}{f_2} = 0.25, \frac{|r_4'|}{f_1} = 0.24$$

Parameters for the scanning lens system:

| | | | |
|---|---|---|---|
| $r_1 = \infty$ | $r_1' = -12.286$ | | |
| | | $d_1 = 15.87$ | $n_1 = 1.59321$ |
| $r_2 = 360.441$ | $r_2' = 360.441$ | | |
| | | $d_2 = 10.09$ | |
| $r_3 = \infty$ | $r_3' = \infty$ | | |
| | | $d_3 = 23.08$ | $n_2 = 1.78565$ |
| $r_4 = -84.545$ | $r_4' = -29.425$ | | |
| $2\omega = 96.5°$ | | | |

EnP: 15.78 in front of the first surface

EXAMPLE 2

Parameters for the overall system:

$$as = 0.005$$
$$fc = 4.5$$
$$D_1 = 2.5, D_2 = 1.0$$
$$f_1 = 125.01, f_2 = 57.05$$
$$fb_1 = 129.73, fb_2 = 130.21$$

$$as \cdot \left(\frac{f_2}{fc}\right)^2 = 0.80, \frac{f_2}{f_1} = 0.46$$

$$\frac{|r_1'|}{f_2} = 0.26, \frac{|r_4'|}{f_1} = 0.23$$

Parameters for the scanning lens system:

| | | | |
|---|---|---|---|
| $r_1 = \infty$ | $r_1' = -15.00$ | | |
| | | $d_1 = 12.00$ | $n_1 = 1.60910$ |
| $r_2 = 369.94$ | $r_2' = 369.94$ | | |
| | | $d_2 = 10.71$ | |
| $r_3 = \infty$ | $r_3' = \infty$ | | |
| | | $d_3 = 21.55$ | $n_2 = 1.76591$ |
| $r_4 = -82.40$ | $r_4' = -29.00$ | | |
| $2\omega = 96.6°$ | | | |

EnP: 16.00 in front of the first surface

The scanning optical system of the present invention has a minimum number of components, i.e., a semiconductor laser, a collimator lens, a deflector and a scanning lens system, and yet is capable of correcting any unevenness that may be introduced in the scanning pitch as a result of an error caused in the deflector in the auxiliary scanning direction. The optical system is also capable of producing a desired spot by compensating for the astigmatic difference inherent in the semiconductor laser and the anisotropy of the angle of spread of light in the parallel and normal directions.

The particular advantages of the scanning lens systems shown in Examples 1 and 2 are that they require a small number of lens elements, can be manufactured easily and exhibit superior performance.

Another embodiment of the present invention will be described with reference to FIG. 10.

Figure 10:
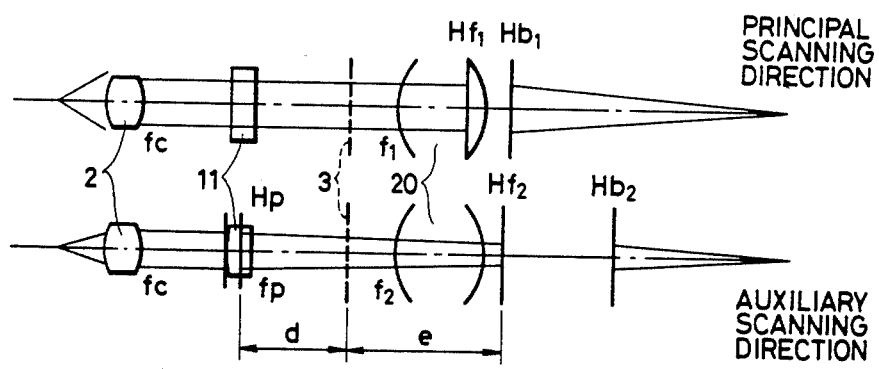
FIG. 10 shows the basic arrangement of another scanning optical system of the present invention.

The scanning optical system shown in FIG. 10 comprises, in order from the object side, the semiconductor laser, a collimator lens 2 that produces substantially parallel rays of light from the beam emitted from the laser, a convex cylindrical lens 11 having a refractive power in the auxiliary direction, a deflector 3 that deflects the rays of light emerging from the cylinder lens 11 which are convergent in the auxiliary scanning direction and are shaped to have a smaller cross section in the auxiliary scanning direction than at the time when they emerged from the collimator lens 2, and an anamorphic scanning lens system 20. The semiconductor laser, the collimator lens 2 and the deflector 3 are of the known types and need not be described in detail. Therefore, the following description concerns primarily the convex cylindrical lens 11 and the anamorphic scanning lens system 20.

In FIG. 10, $Hf_1$ and $Hb_1$ represent the positions of the front and rear principal points, respectively, within a cross section taken in the principal scanning direction; $Hf_2$ and $Hb_2$ represent the positions of the front and rear principal points within a cross section taken in the auxiliary scanning direction; d denotes the distance between the rear principal point Hp of the convex cylinder lens 11 and the deflecting surface 3; and e represents the distance between the deflecting surface 3 and the front principal point $Hf_2$ of the scanning lens 20 within a cross section taken in the auxiliary scanning direction.

In accordance with the embodiment shown in FIG. 10, the convex cylindrical lens 11 is disposed between the collimator lens 2 and the deflector 3, and the scanning lens system 20 has an anamorphic configuration. Therefore, the focal distance in the principal scanning direction, $f_1$, can be made larger than the focal distance in the auxiliary scanning direction, $f_2$. In addition, since the error in image point in the auxiliary scanning direction is given by $$f_2 \cdot \frac{f_p - d}{f_2 + f_p - (d + e)} \cdot \Delta\theta_S,$$

the lens system 20 to the error in the deflecting surface in the auxiliary scanning direction is reduced by the amount represented by Formula (1) as compared with the case where the scanning lens is composed of a spherical lens system having the focal distance of $f_1$:

$$\frac{f_2}{f_1} \cdot \frac{f_p - d}{f_2 + f_p - (d + e)}. \quad (1)$$

The combination of the scanning lens system 20 and the cylindrical lens 11 has a focal distance, $f_2'$, in the auxiliary scanning direction, which is expressed by:

$$f_2' = \frac{f_2 \cdot f_p}{f_2 + f_p - (d + e)}. \quad (1)$$

The diameters of the spots, $S_1$ and $S_2$, formed by the beams in the principal and auxiliary scanning directions, respectively, are given by:

$$S_1 = k \cdot \lambda \cdot (f_1/D_1)$$

$$S_2 = k \cdot \lambda \cdot (f_2'/D_2)$$

From these equations, the ratio of $S_2$ to $S_1$ can be calculated as:

$$\frac{S_2}{S_1} = \frac{f_2'}{f_1} \cdot \frac{D_1}{D_2} = \frac{f_2}{f_1} \cdot \frac{f_p}{f_2 + f_p - (d + e)} \cdot \frac{\sin(\theta_1/2)}{\sin(\theta_2/2)} \quad (2)$$

This means that the scanning lens system 20 combined with the cylinder lens 11 displays the ability to shape the beam by the amount indicated by:

$$\frac{f_2'}{f_1} = \frac{f_2}{f_1} \cdot \frac{f_p}{f_2 + f_p - (d + e)}. \quad (3)$$

Therefore, if the system is designed to satisfy the relation expressed by Formula (4):

$$(f_2'/f_1) \approx (\theta_2/\theta_1) \quad (4)$$

a substantially circular spot can be obtained on the scanning surface. In the absence of the convex cylinder lens 11 (i.e., $f_p = \infty$), $f_2'$ is equal to $f_2$, and the degree of correction of the error in the deflecting surface in the auxiliary scanning direction and that of beam shaping are both reduced to $f_2/f_1$. However, in accordance with the present invention, the degree of correction of the error in the deflecting surface in the auxiliary scanning direction is given by Formula (1) while the degree of beam shaping is expressed by formula (3), and this means that a greater degree of freedom can be provided for the two phenomena by appropriately selecting the values of $f_p$, d and e.

In short, the convex cylindrical lens 11 used in the system of the present invention permits the degree of correction of the error in the deflecting surface in the auxiliary scanning direction and that of beam shaping to be adjusted in the appropriate manner. If the relation indicated by Formula (4) is satisfied, a substantially circular spot is obtained and the error in the deflecting surface in the auxiliary scanning direction can be corrected in a more efficient manner.

If for some reason such as limitations with respect to the manufacturing practice, the collimator lens 2 is unable to have a sufficiently large numerical aperture to accept the component of light in the normal direction, $S_1$ inevitably becomes greater than $S_2$ even if Formula (4) is satisfied. A spot having equal diameters in both directions is obtained by providing an additional slit in the parallel direction that limits the passage of light rays. In accordance with the system of the present invention in which the convex cylindrical lens 11 having a refractive power in the auxiliary scanning direction is inserted between the collimator lens 2 and the scanning lens system 20, the rays of light emerging from the cylindrical lens 11 are convergent in the auxiliary scanning direction and the flux of rays that are incident on the scanning lens system 20 has been shaped to have a smaller cross section in the auxiliary scanning direction than at the time when they emerged from the collimator lens 2. Because of these features an additional slit will not impose undue limits on the flux of light, thereby causing minimum loss in the quantity of light. Another advantage results from the fact that the flux of light rays that are to enter the scanning lens 20 has been made thin in the auxiliary scanning direction as a result of passage through the convex cylinder lens 11: this provides favorable conditions for the purpose of correcting aberrations and permitting greater tolerances in the intensional precision of the toric surface which is difficult to obtain by surface finishing.

The specific examples of the scanning optical system of the present invention are hereunder described.

Figure 11:
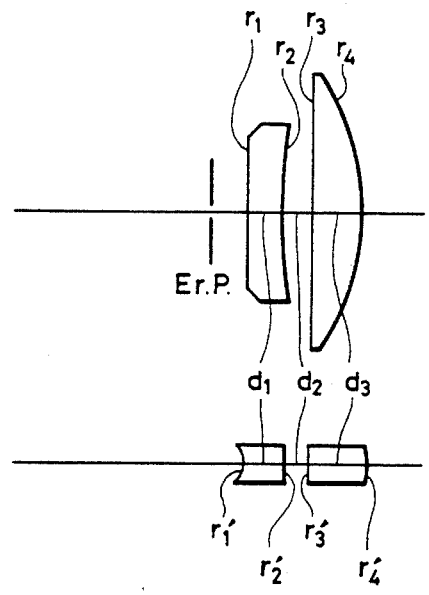
FIG. 11 shows the arrangement of the scanning lens system used in Example 3.
Figure 12:
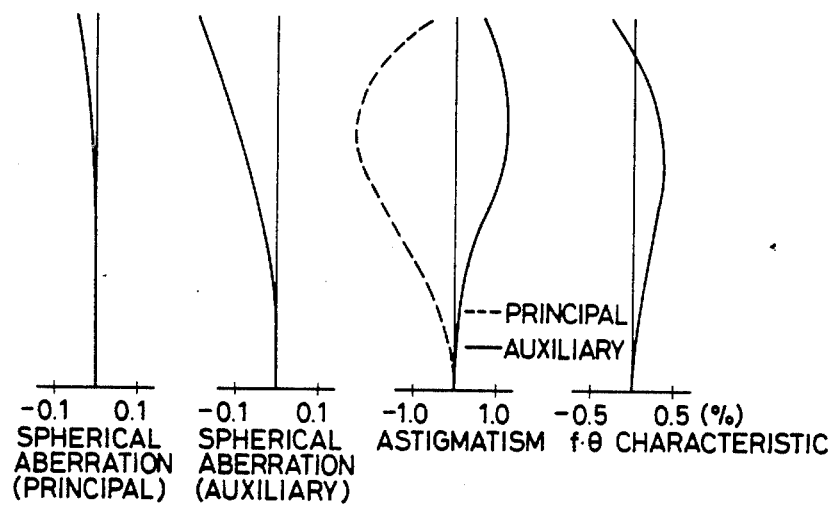
FIG. 12 shows aberration diagrams for the overall system disclosed in Example 3.
Figure 13:
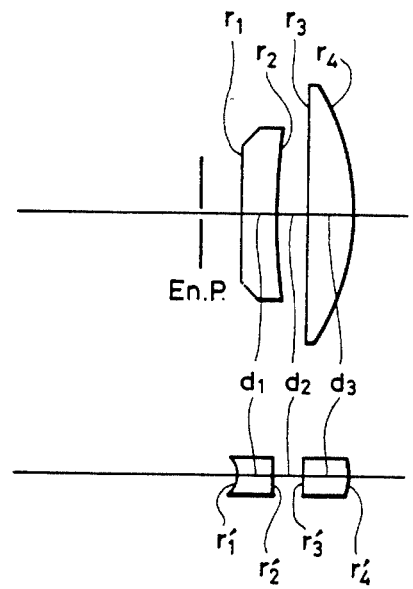
FIG. 13 shows the arrangement of the scanning lens system disclosed in Example 4.
Figure 14:
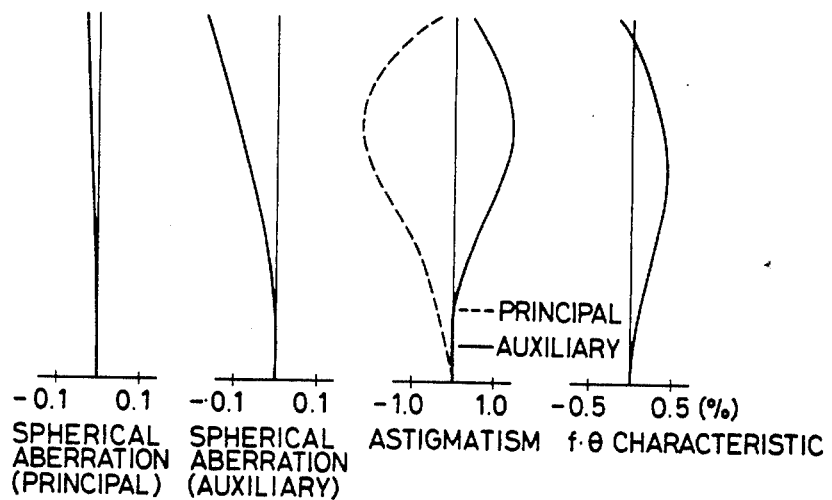
Figure 15:
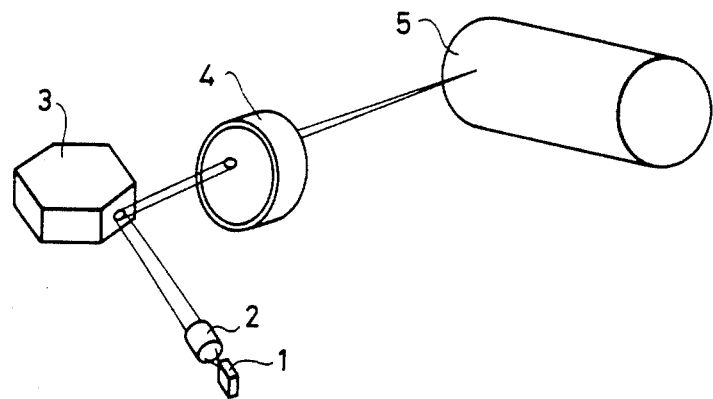
FIG. 15 is the general view showing a prior art scanning optical system such as a laser beam printer.
Figure 16:
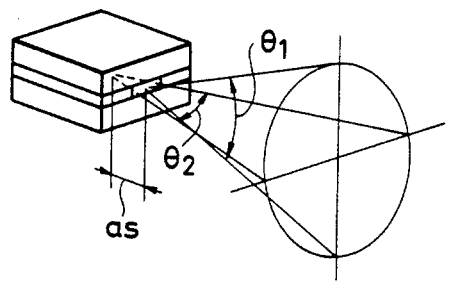
FIG. 16 is a sketch illustrating how light from a semiconductor laser is radiated in different modes as between the direction parallel to the junction surface and the direction normal thereto.
Figure 17:
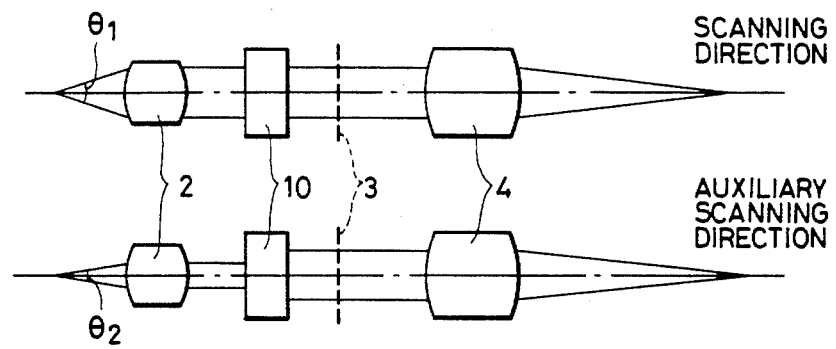
FIGS. 17 to 20 are diagrams showing variations of the prior art scanning optical system.
Figure 18:
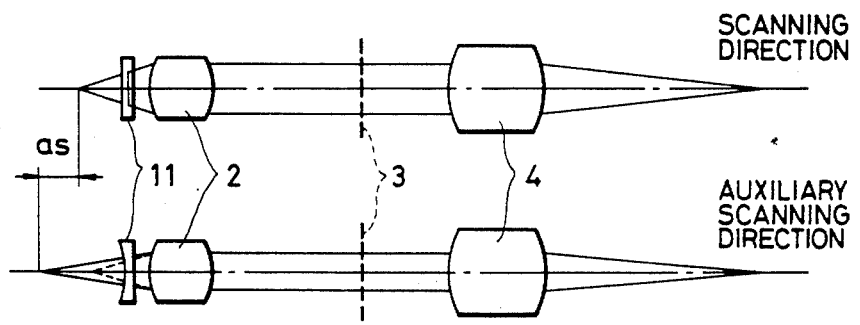
Figure 19:
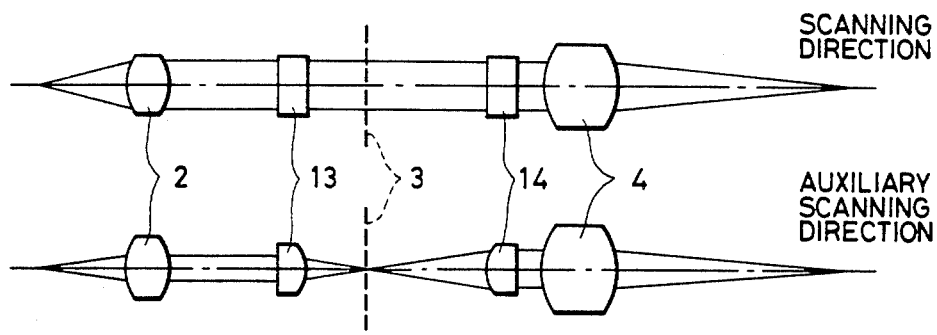
Figure 20:
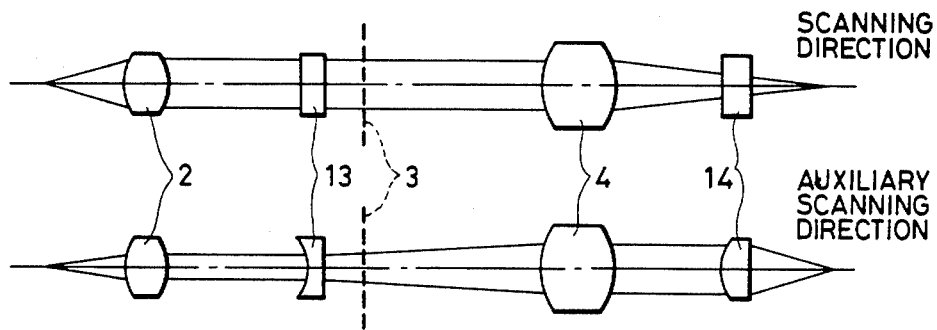

FIG. 11 is the general schematic view of the scanning optical system in accordance with the present invention; as shown, the system comprises the semiconductor laser 1, the collimater lens 2, the convex cylindrical lens 11 having curvature in the auxiliary scanning direction, the deflector 3, and the anamorphic scanning lens system 20 composed of two lens units.

In accordance with the present invention, the scanning lens system 20 is anamorphic, so $f_2$ can be made sufficiently smaller than $f_1$ to attain the advantage of correction of the error in the deflecting surface in the auxiliary scanning direction, as well as to shape the laser beam that has been adjusted by the convex cylindrical lens 11. In addition, the scanning lens system includes within a cross section taken in the auxiliary scanning direction a concave cylindrical surface having a negative refractive power toward the deflector and a convex toric surface having a positive refractive power toward the scanning surface. Because of this "retrofocal" arrangement, the position of the principal point on the image side in the auxiliary scanning direction can be shifted toward the scanning surface by a sufficient amount to obtain matching between the image point in the principal scanning direction and that in the auxiliary scanning direction using the optical system including the convex cylindrical lens 11. It should, however, be noted that the actual amount of offset that is preliminarily provided for the image points on the optical axis may be varied slightly in consideration of the curvature of field or the deviation from the best image plane.

It should also be mentioned that because of the structural limitations inherent in the semiconductor laser, the transversal mode of oscillation and other factors may produce a non-ideal light source in the parallel direction, which will eventually lead to the formation of a large spot as a result of laser beam emission. This phenomenon can be effectively dealt with by the system of the present invention wherein the focal distance of the scanning lens in the auxiliary scanning direction is sufficiently shorter than in the scanning direction to provide a lower magnification for the projection of the light source.

The f-$\theta$ lens has the first cylindrical surface A and the fourth toric surface D, and is combined with the cylindrical lens 11 disposed in front of the deflector surface 3. These parameters are independent of the scanning direction and, hence, are advantageous for the purpose of correcting the curvature of field within a cross section taken in the auxiliary scanning direction.

This method is particularly suitable for use with a semiconductor laser of the type having an astigmatic difference because it is capable of compensating for mismatching in the optical axial direction that occurs between the image point formed in the principal scanning direction and the image point formed in the auxiliary scanning direction. The positions of the focal points in the principal and auxiliary scanning directions may also be adjusted by changing the curvature and position of the convex cylinder lens 11, and this method of adjustment has the advantage that the image point in the principal scanning direction remains fixed and that no variations are introduced into the scanning performance of the overall system.

A scanning optical system having even better performance can be constructed if the following relations are satisfied:

$$0.5 < \frac{f_p - d}{f_1} < 2.5 \quad (4)$$

-continued $$0.4 < \frac{f_2}{f_1} \cdot \frac{f_p}{f_p - d} < 0.7 \quad (5)$$

$$0.15 < \frac{|r_1'|}{f_2} < 0.25 \quad (6)$$

$$0.2 < \frac{|r_4'|}{f_1} < 0.3 \quad (7)$$

where
- $f_p$: the focal distance of the convex cylindrical lens 11 having a curvature in the auxiliary scanning direction;
- d: the distance between the rear principal point of the convex cylindrical lens 11 the deflector surface 3;
- $f_1$: the focal distance of the scanning lens system 20 within a cross section taken in the principal scanning direction;
- $f_2$: the focal distance of the scanning lens system within a cross section taken in the auxiliary scanning direction;
- $r_1'$: the radius of curvature of a cross section of the first surface A of the scanning lens system 20 taken in the axuiliary scanning direction; and
- $r_4'$: the radius of curvature of a cross section of the fourth surface D of the lens system 20 taken in the auxiliary scanning direction.

Relation (4) specifies the requirement that should be satisfied by the focal distance of the convex cylinder lens 11. If $(f_p - d)/f_1$ is equal to or smaller than 0.5, the efficiency of causing incident rays of light to fall as a small flux within a cross section taken in the auxiliary scanning direction is increased. However, in order to attain matching between the focal point in the auxiliary scanning direction and that in the principal scanning direction, the first cylindrical surface A is required to have a very small radius of curvature, but then, considerable difficulty is involved in working the first surface A to provide the desired small radius of curvature. If $(f_p - d)/f_1$ is equal to or greater than 2.5, the efficiency of causing incident rays of light to fall as a small flux within a cross section taken in the auxiliary scanning direction is decreased and, at the same time, the convex cylinder is required to have an increased radius of curvature, which is also difficult to attain by the working techniques available today.

Relation (5) specifies the requirement that should be satisfied by the ratio of the focal distance of the scanning lens system 20 in the auxiliary scanning direction to the focal distance in the principal scanning direction, so that a balance is struck between the efficiency of correction of the error in the deflecting surface in the auxiliary scanning direction and the efficiency of beam shaping. If $(f_2/f_1) \cdot (f_p/(f_p - d))$ is equal to or smaller than 0.4, the efficiency of correcting the error in the deflecting surface in the auxiliary scanning direction is increased but, at the same time, the beam shaping effect becomes excessively great. If $(f_2/f_1) \cdot (f_p/(f_p - d))$ is equal to or greater than 0.7, the desired efficiency is not attained not only in terms of correcting the error in the deflecting surface in the auxiliary scanning direction but also with respect to beam shaping.

Relation (6) specifies the requirement that should be satisfied by the radius of curvature of the cylindrical surface. If $|r_1'|/f_2$ is equal to or smaller than 0.15, the degree by which the rays of light within a cross section of the first surface taken in the auxiliary scanning direction are made divergent is so much increased that that it becomes difficult to correct the curvature of field in a manner that strikes a balance between $r_1'$ and $r_4'$. If $|r_1'|/f_2$ is equal to or greater than 0.25, the distance between the principal points within a cross section taken in the auxiliary scanning direction cannot be effectively increased, and in order to bring the principal point on the image side sufficiently close to the image plane, the overall size of the lens system must be increased. In addition, the negative curvature of field that will develop at the toric surface cannot be adequately corrected.

Relation (7) specifies the requirement that should be satisfied by the radius of curvature of the toric surface within a cross section taken in the auxiliary scanning direction. If $|r_4'|/f_1$ is equal to or smaller than 0.2, the principal point on the image side cannot be brought sufficiently close to the image plane and the negative curvature of field will occur in a great amount. If $|r_4'|/f_1$ is equal to or greater than 0.3, the focal distance in the auxiliary scanning direction cannot be rendered sufficiently smaller than the focal distance in the principal scanning direction to achieve the desired degree of correction of the inclination of the deflector surface or of the beam shaping effect.

The two examples assume the following conditions: the collimator lens 2 has a focal distance of fc; the rays of light emerging from the collimator lens 2 have a diameter of $D_1$ in the principal scanning direction and a diameter of $D_2$ in the auxiliary scanning direction; the convex cylindrical lens 11 has a focal distance of fp; the rear principal point in the cylinder lens 11 is spaced from the deflector surface 3 by a distance of d; the deflector surface 3 is apaced from the front principal point in the scanning lens system 20 by a distance of e; the scanning lens system 20 has a focal distance of $f_1$ in the auxiliary scanning direction; and the combination of the scanning lens system 20 and the convex cylindrical lens 11 has a focal distance of $f_2'$ in the auxiliary scanning direction.

EXAMPLE 4

Parameters for the overall system:

| | | |
|---|---|---|
| fc = 5.5 | fp = 167.41 | |
| $D_1$ = 2.0 | $D_2$ = 1.4 | |
| $f_1$ = 125.00 | $f_2$ = 52.78 | $f_2'$ = 80.90 |
| d = 50.0 | e = 60.97 | |
| $\frac{f_p - d}{f_1} = 0.94$ | $\frac{f_2}{f_1} \cdot \frac{f_p}{f_p - d} = 0.60$ | |

Parameters for the scanning lens system:

| | | | |
|---|---|---|---|
| $r_1 = \infty$ | $r_1' = -10.326$ | $d_1 = 14.50$ | $n_1 = 1.60910$ |
| $r_2 = 374.32$ | $r_2' = 374.32$ | $d_2 = 10.27$ | $n_2 = 1.76591$ |
| $r_3 = \infty$ | $r_3' = \infty$ | $d_3 = 22.32$ | |
| $r_4 = -82.52$ | $r_4' = -28.00$ | | |

$$\frac{|r_1'|}{f_2} = 0.20 \qquad \frac{|r_4'|}{f_1} = 0.22$$

$2\omega = 96.5°$
Enp: 15.17 in front of the first surface

EXAMPLE 4

Parameters for the overall system

| | | |
|---|---|---|
| fc = 4.5 | fp = 278.04 | |
| D₁ = 2.0 | D₂ = 1.2 | |
| f₁ = 125.03 | f₂ = 58.93 | |
| d = 50.0 | e = 63.67 | f₂' = 73.37 |
| $\frac{fp - d}{f_1} = 1.82$ | $\frac{f_2}{f_1} \cdot \frac{fp}{fp - d} = 0.57$ | |

Parameters for the scanning lens system:

| | | | |
|---|---|---|---|
| r₁ = ∞ | r₁' = −13.3 | d₁ = 13.89 | n₁ = 1.60910 |
| r₂ = 365.98 | r₂' = 365.98 | d₂ = 11.46 | n₂ = 1.76591 |
| r₃ = ∞ | r₃' = ∞ | d₃ = 19.00 | |
| r₄ = −82.20 | r₄' = −29 | | |

$\frac{|r_1'|}{f_2} = 0.23 \qquad \frac{|r_4'|}{f_1} = 0.23$

2ω = 96.5°
Enp: 16.0 in front of the first surface

I claim:

1. In a scanning optical system composed of a semiconductor laser, a collimator lens that produces substantially parallel rays of light from the beam emitted from the semiconductor laser, a deflector for deflecting said parallel rays of light, and a scanning lens system that focuses the deflected rays to form a spot on a scanning surface, the improvement wherein the normal direction in which light emitting from the semiconductor laser has a wide angle spread is in alignment with a scanning direction of said scanning optical system, said scanning lens system having an anamorphic configuration and being so designed that the point of an image formed in an auxiliary scanning direction upon receiving parallel rays of light containing no astigmatism is offset from the point of an image formed in the scanning direction.

2. A scanning optical system according to claim 1 wherein said scanning lens system is composed of a plurality of lens units, the first lens unit which is the closest to the deflector having a concave cylindrical surface having a curvature in the auxiliary scanning direction while the final lens unit which is farthest from the deflector having a convex toric surface having a small radius of curvature in the auxiliary scanning direction.

3. A scanning optical system according to claim 1, wherein there is no cylindrical lens between said collimator lens and said deflector.

4. A scanning optical system comprising a semiconductor laser, a collimator lens that produces substantially parallel rays of light from the beam emitted from said semiconductor laser, a convex cylinder lens having a curvature within a cross section taken in an auxiliary scanning direction, a deflector that deflects the rays of light emerging from said cylinder lens which are convergent in the auxiliary scanning direction and are shaped to have a smaller cross section in the auxiliary scanning direction that at the time when they emerged from said collimator lens, and a scanning lens system that focuses said deflected rays to form a spot on a scanning surface, the normal direction in which light emitting from said semiconductor laser has a wide angle spread being in alignment with the scanning direction of said scanning lens system, said scanning lens system having an anamorphic configuration and being so designed that the point of an image formed in the scanning direction is coincident with the point of an image formed in the auxiliary scanning direction.

5. A scanning optical system according to claim 4 wherein said scanning lens system is composed of a plurality of lens units, the first lens unit which is the closest to the deflector having a concave cylindrical surface having a curvature in the auxiliary scanning direction while the final lens unit which is farthest from the deflector having a convex toric surface having a small radius of curvature in the auxiliary scanning direction.

6. A scanning optical system according to claim 1 wherein said scanning lens system satisfies the following relations:

$$0.5 < \frac{fp - d}{f_1} < 2.5 \qquad (4)$$

$$0.4 < \frac{f_2}{f_1} \cdot \frac{fp}{fp - d} < 0.7 \qquad (5)$$

$$0.15 < \frac{|r_1'|}{f_2} < 0.25 \qquad (6)$$

$$0.2 < \frac{|r_4'|}{f_1} < 0.3 \qquad (7)$$

where $f_p$: the focal distance of the convex cylinder lens having a curvature in the auxiliary scanning direction;

d: a distance between a rear principal point of the convex cylinder lens and the deflector surface;

$f_1$: the focal distance of the scanning lens system within a cross section taken in the principal scanning direction;

$f_2$: the focal distance of the scanning lens system within a cross section taken in the auxiliary scanning direction;

$r_1'$: the radius of curvature of a cross section of the first surface of the scanning lens system taken in the auxiliary scanning direction; and $r_4'$: the radius of curvature of a cross section of the fourth surface of the scanning lens system taken in the auxiliary scanning direction.

7. In a scanning optical system composed of a semiconductor laser, a collimator lens that produces substantially parallel rays of light from the beam emitted from the semiconductor laser, a deflector for deflecting said parallel rays of light, and a scanning lens system that focuses the deflected rays to form a spot on a scanning surface, the improvement wherein the normal direction in which light emitting from said semiconductor laser has a wide angle spread is in alignment with a scanning direction of said scanning optical system, said scanning lens system comprising an f·θ lens that is composed of two lens units and which has, in order from the deflector side, a first concave cylindrical surface having a curvature in an auxiliary scanning direction, a second concave spherical surface, a third planar surface, and a fourth toric surface having a small radius of curvature in the auxiliary scanning direction, said scanning lens system having an anamorphic configuration and being so designed that the point of an image formed in the auxiliary scanning direction upon receiving parallel rays of light containing no astigmatism is offset from the point of an image formed in the scanning direction.

8. A scanning optical system according to claim 7 wherein said scanning lens system satisfies the following relations:

$$0.3 < \frac{f_2}{f_1} < 0.6 \quad (1)$$

$$0.2 < \frac{|r_1'|}{f_1} < 0.3 \quad (2)$$

$$0.2 < \frac{|r_4'|}{f_2} < 0.3 \quad (3)$$

where
- $f_1$: the focal distance of a cross section taken in the scanning direction;
- $f_2$: the focal distance of a cross section taken in the auxiliary scanning direction;
- $r_1'$: the radius of curvature of a cross section of the first surface taken in the auxiliary scanning direction; and
- $r_4'$: the radius of curvature of a cross section of the fourth surface taken in the auxiliary scanning direction.

9. A scanning optical system comprising a semiconductor laser, a collimator lens that produces substantially parallel rays of light from the beam emitted from said semiconductor laser, a convex cylinder lens having a curvature within a cross section taken in an auxiliary scanning direction, a deflector that deflects the rays of light emerging from said cylinder lens which are convergent in the auxiliary scanning direction and are shaped to have a smaller cross section in the auxiliary scanning direction than at the time when they emerged from said collimator lens, and a scanning lens system that focuses said deflected rays to form a spot on a scanning surface, the normal direction in which light emitting from said semiconductor laser has a wide angle spread being in alignment with the scanning direction of said scaning lens system, said scanning lens system comprising an f·θ lens that is composed of two lens units and which has, in order from the deflector side, a first concave cylindrical surface having a curvature in the auxiliary scanning direction, a second concave spherical surface, a third planar surface and a fourth toric surface having a small radius of curvature in the auxiliary scanning direction, said scanning lens system having an anamorphic configuration and being so designed that the point of an image formed in the scanning direction is coincident with the point of an image formed in the auxiliary scanning direction.

* * * * *